United States Patent [19]

Bodewig

[11] Patent Number: 4,497,997
[45] Date of Patent: Feb. 5, 1985

[54] METHOD AND APPARATUS FOR METAL ARC WELDING WITH CONSTANT CURRENTS

[75] Inventor: Peter W. Bodewig, Ratingen, Fed. Rep. of Germany

[73] Assignee: UTP Schweissmaterial GmbH & Co., Bad Krozingen, Fed. Rep. of Germany

[21] Appl. No.: 496,394

[22] Filed: May 20, 1983

[30] Foreign Application Priority Data

May 26, 1982 [DE] Fed. Rep. of Germany ....... 3219726

[51] Int. Cl.³ ................................................ B23K 9/09
[52] U.S. Cl. ........................ 219/137 PS; 219/130.51; 219/130.31
[58] Field of Search ............... 219/130.51, 137 PS, 219/130.33, 130.31

[56] References Cited

U.S. PATENT DOCUMENTS

| 4,201,906 | 5/1980 | Puschner | 219/137 PS |
| 4,301,355 | 11/1981 | Kimbrough et al. | 219/137 PS |
| 4,409,465 | 10/1983 | Yamamoto et al. | 219/137 PS |
| 4,427,874 | 1/1984 | Tabata et al. | 219/130.51 |

FOREIGN PATENT DOCUMENTS 52-71356  6/1977  Japan .............................. 219/130.33

Primary Examiner—Clifford C. Shaw
Attorney, Agent, or Firm—Staas & Halsey

[57] ABSTRACT

The invention relates to a process and an apparatus for metal arc welding with a consumable electrode. A pulsating current is supplied to the electrode from a constant current source. During the interpulse periods between pulses there flows a minimum current which is at least sufficient to maintain the arc. The switch from pulse current to interpulse current occurs as a function of the arc voltage, with switching to pulse current occurring if a minimum voltage is detected and to interpulse current occurring if a maximum voltage is detected. Compared with conventional metal arc welding with a consumable electrode, this method offers the advantage of a better welding quality.

15 Claims, 6 Drawing Figures

METHOD AND APPARATUS FOR METAL ARC WELDING WITH CONSTANT CURRENTS

BACKGROUND OF THE INVENTION

The invention relates to a metal arc welding method, wherein a pulsating current is supplied to a consumable electrode.

In a prior art process of this kind, the so-called MIG-pulsed-arc process, adjustable voltage pulses are superimposed upon an adjustable fundamental voltage. These voltage pulses lead to a burn-off of the electrode and, at a suitable electrode feed rate, to a transfer of droplets to the workpiece through the arc. However, in this welding process, the adjustment of the electrode feed rate to the burn-off rate is extremely critical. If the electrode feed rate and burn-off rate are not properly chosen, shorts, spatter, pore formation, and lack of fusion will result, or a spray arc will be produced instead of the desired transfer of droplets to the workpiece through the arc. These disadvantages of lower quality are offset by the advantage that the method can be practiced at a higher welding speed.

If a high-quality weld joint is required, the so-called WIG process is employed. In this process, a constant current is supplied to the arc via a non-consumable electrode. The welding material is supplied separately. The disadvantage is that this process can only be implemented at a relatively low welding rate but this disadvantage is offset by the high welding quality.

SUMMARY OF THE INVENTION

The object of the invention is to create a method by which welding qualities can be obtained which are better than those achieved with the MIG or MAG processes at a higher welding speed.

This object is achieved in accordance with the teachings of the invention by setting the current during the pulses at a constant maximum current which ensures the burn-off and, during the intervals between pulses, at a substantially lower current rate which maintains the arc, wherein the changeover from pulse current to interpulse current, and vice versa, occurs as a function of the arc voltage.

In the process according to the invention, shorts and, thereby, material spatters are precluded, because even before the guided electrode touches the workpiece during the burn-off times, the maximum current is again cut in so as to burn back the electrode. Since the arc is not quenched, but is maintained even during the interpulse periods, no new arc striking is necessary. Also, the guiding speed of the electrode is not critical for carrying out the process. Since the arc voltage is measured, the spacing between the electrode and the workpiece determined by the guiding speed is also taken into account. Therefore, the process can be used not only with a mechanical electrode feed, but also when the electrode is guided by hand. Also, the arc has directional stability. The setting of the parameters (pulsed current, interpulse current, lower reference voltage, upper reference voltage, electrode feed rate) for certain welding qualities can be reproduced with ease. The welding process can in many cases be controlled by the feed rate. The well-known crater formation at the end of the welding process can easily be avoided by reducing the electrode feed rate to zero within a given period. For this reduction, a gradual decrease of the high-current phases and an increase of the interpulse current phases take place.

The electrode guiding rate must be coordinated with the electrode burn-off rate, which is dependent on the current supply. During the pulses, the burn-off rate is greater than the electrode guiding rate, resulting in an increase of the spacing between the workpiece and the electrode tip. During the interpulse periods, the current can be adjusted to a value where there is still a burn-off, but the burn-off rate must be lower than the feed rate. Preferably, the current is so adjusted that burn-off is precluded, yet arc maintenance is assured.

The pulse recurrence rate and, thereby, the welding conditions, can be varied or controlled by selecting the feed rate and the current.

A metal arc welding apparatus with a consumable electrode which is advanced at a constant feed rate, and which includes a current source which delivers a pulsed current to the electrode and a controlling means assigned to the current source and to which the arc voltage is supplied to, is characterized in accordance with the invention by the fact that the current source is a constant current source which, upon attaining an upper reference voltage, is switched by the controlling means to a minimum output current as a function of the arc voltage and, upon reaching a lower reference voltage, to a maximum output current.

Preferably, the controlling means comprises two parallel-connected comparators, to the inverting inputs of which are applied the two reference voltages and the arc voltage, and the outputs of which are connected to the input of a changeover switch for the constant current source via diodes of opposite polarity. The constant current source may be a transistorized or a thyristorized current source with a dynamic current-voltage characteristic. However, a conventional current source with a static current-voltage characteristic can also be employed as a constant current source, in which case an electronic switch with a shunt should be provided for the switch from the maximum to the minimum output current.

As mentioned earlier, the welding properties can be controlled by varying various parameters. To do this, the feed rate of the electrode guiding device can be adjusted. If, for example, the feed rate is increased, the interpulse periods are diminished while the pulse length is increased.

The arc length can be changed by varying the reference voltages.

The pulse recurrence frequency can be changed by varying the values of the pulse current and interpulse current.

BRIEF DESCRIPTION OF THE DRAWINGS

The invention will be explained with reference to accompanying drawings wherein.

DESCRIPTION OF THE PREFERRED EMBODIMENTS

Figure 1:
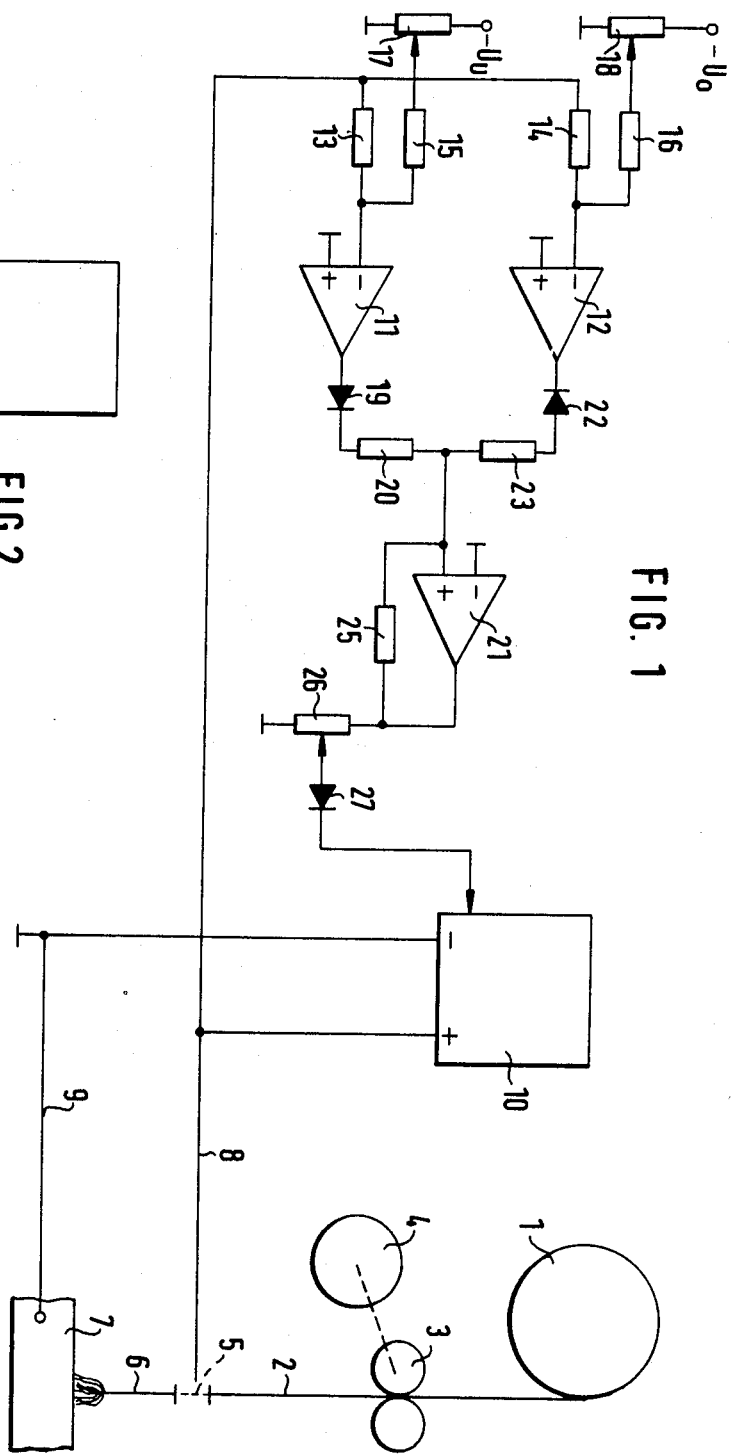
FIG. 1 is a schematic representation of the metal arc welding apparatus.
Figure 2:
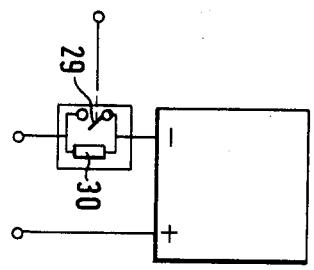
FIG. 2 shows a constant current source modified for the constant curent source of the apparatus of FIG. 1.

A welding wire 2 is fed from a wire coil 1 to a welding torch 5 by means of a guiding device comprised of feed rolls 3 and drive motor 4, the end of the welding wire 2 projecting as electrode 6 from the welding torch 5. The welding torch 5 and a workpiece 7 to be welded are connected to a constant current source 10 via power supply lines 8, 9. The constant current source 10 can be switched to two output currents, the smaller current or current between pulses ranging between 3 and 15 A. As will be explained below with the aid of the pulse diagrams, both the lower interpulse current and the higher current can be set at different values. The constant current source 10 should having a dynamic current-voltage characteristic and be transistorized or thyristorized, so that its output current can be switched rapidly between pulsed current and interpulse current.

A controlling means is assigned to the constant current source 10. The controlling means is comprised of two parallel-connected comparators 11 and 12, to the inverting inputs of which are applied, via resistors 13 and 14, the arc voltage. Lower and upper reference voltages $U_{uref}$, $U_{oref}$, which can be set by potentiometers 17 and 18, are also applied to the inverting inputs via resistors 15 and 16. The output of the comparator 11 is connected via a diode 19 of positive polarity and a resistor 20 to the non-inverting input of an operational amplifier 21, whereas the output of the comparator 12 is connected to the non-inverting input of the operational amplifier 21 via a diode 22 of negative polarity and a resistor 23. The output of the operational amplifier 21 is coupled to the non-inverting input via a resistor 25, so that the operational amplifier 21 acts as a bistable switch. The output of the operational amplifier 21 is connected to the desired-value input of the constant current source 10 via an adjustable potentiometer 26 and a diode 27 of positive polarity.

The design of the metal arc welding apparatus can be modified by using a conventional constant current source with a static current-voltage characteristic, e.g., a constant current source with a transductor, said constant current source being adjustable to the maximum welding current.

To reduce the current to the interpulse current level there is provided in the power supply line 9 an electronic switch 29 with a shunt 30 which is activated by the operational amplifier 21. As long as the electronic switch is closed, the maximum output current will flow, whereas with an open switch 29 the shunt resistor 30 will only allow the interpulse current to pass.

The apparatus described above operates as follows:

After striking the arc, be it through contact or by a high-frequency pulse, with a minimum spacing between the electrode 6 and the workpiece 7, the arc voltage is lower than the lower reference voltage set at the potentiometer 17. Therefore, the comparator 11 detects a negative signal at its input. This signal is inverted, so that it passes through the diode 19 as well as through the non-inverting input of the operational amplifier 21. Hence, a positive voltage drop occurs at the potentiometer 26 and is applied through diode 27 to the desired-value input of the constant current source 10 as a control signal for maximum welding current. Thus, the constant current source 10 is switched high. The electrode 6 burns off as a result of this high current. The feed rate of the guiding device 3, 4 is so adjusted that the burn-off rate is higher than the feed rate. Therefore, the arc length increases and, thereby, the arc voltage.

An increase of the arc voltage with respect to the lower reference voltage does not alter the switching condition of the positive-feedback operational amplifier 21, because the signal, which is negative after inversion by the comparator 11, is blocked off by the diode 19. Therefore, the positive output signal of the operational amplifier 21 continues to be applied to the desired-value input of the constant current source 10.

As soon as the arc voltage exceeds the upper reference voltage $U_{oref}$, a negative signal reaches the operational amplifier 21 via the diode 22 because of the inversion of the comparator 12, so that the output of operational amplifier 21 is changed over. The negative signal at the output of the operational amplifier 21 is blocked off by the diode 27 from the desired-value input of the constant current source 11. The constant current source no longer obtains a signal for high current so that it switches to the minimum or interpulse current. This current reduction results in greatly diminishing the burn-off rate of the electrode 6 or even stopping it completely. However, since the current supply is not stopped completely, but is maintained, the arc is not quenched. The electrode tip approaches the work, causing the arc voltage to be lowered. During this time, the switching condition of the operational amplifier 21 remains unchanged because the diode 22 blocks off the signal, which is positive after inversion by the comparator 12, from the input of the operational amplifier 21. As soon as the electrode has approached the workpiece 7 so close that the arc voltage has dropped to the value of the lower reference voltage $U_{uref}$, the switch to high current as described above takes place, starting a new burn-off of the electrode with increasing spacing between the electrode tip and the work.

Figure 3:
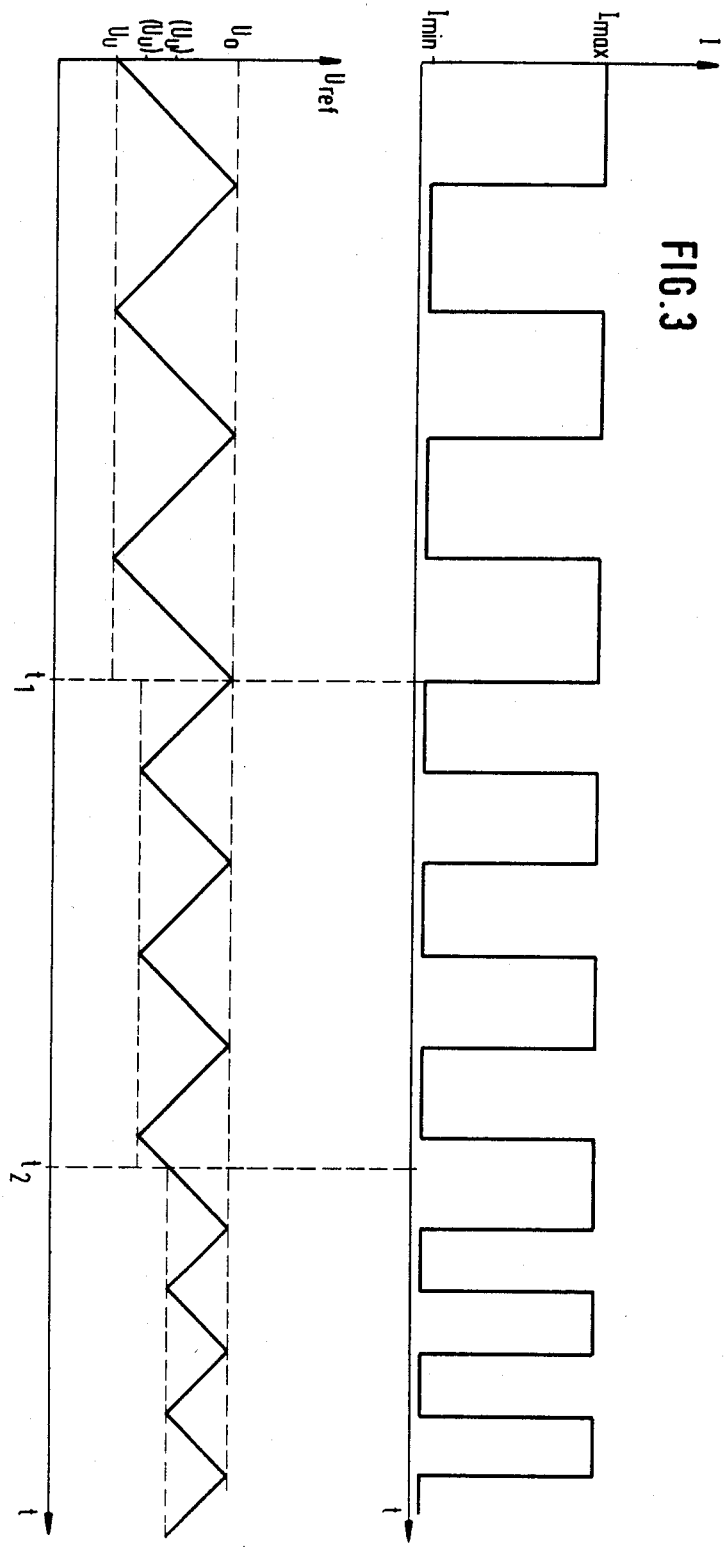
FIGS. 3-6 show various current and voltage diagrams for the arc.
Figure 4:
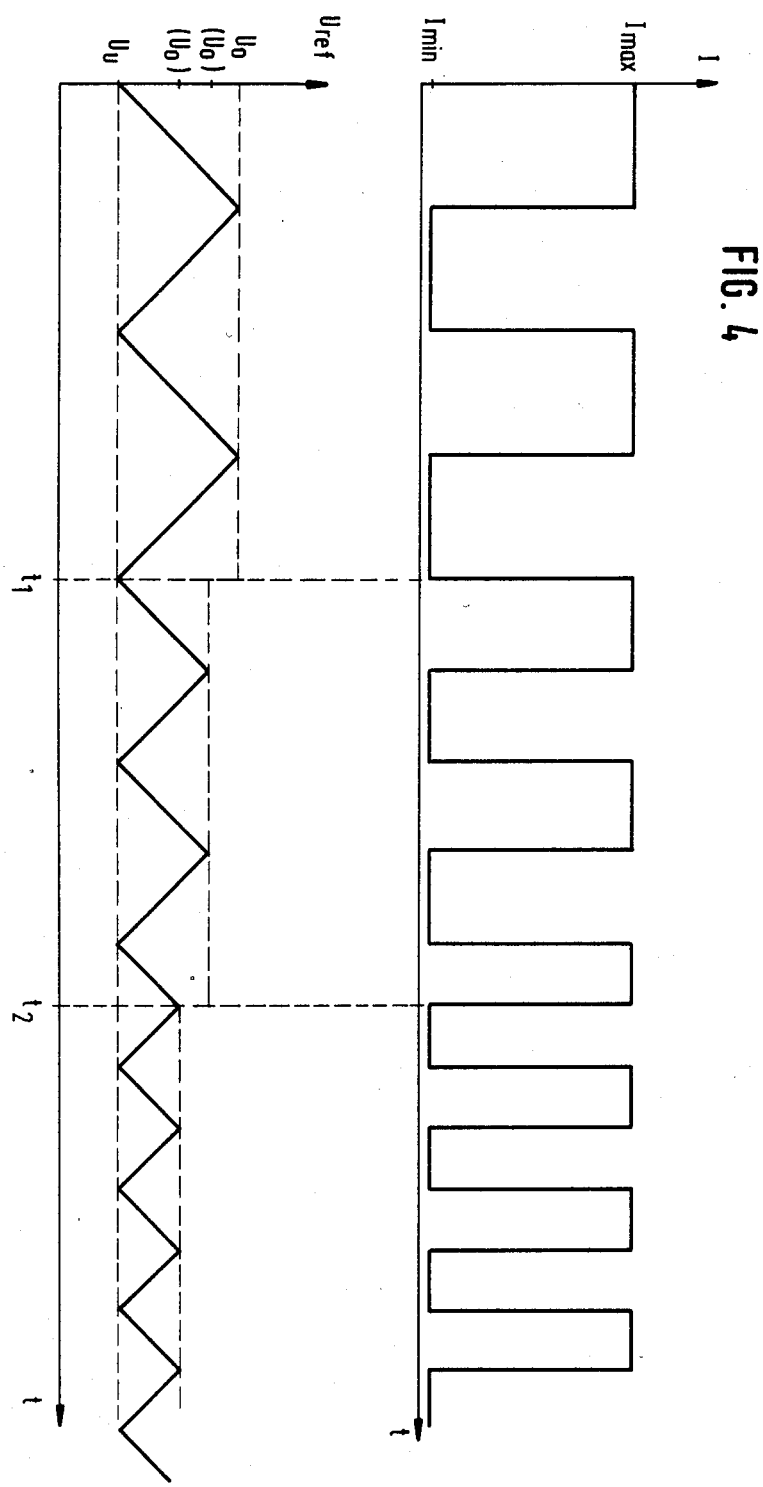

The maximum current and the feed rate of the welding wire can be so tuned to one another that the pulse duration equals the interpulse periods. Such a setting is shown in the diagrams of FIGS. 3 and 4. In these diagrams, the lower reference voltage $U_{uref}$ has been raised at instants $t_1$ and $t_2$, or the upper reference voltage $U_{oref}$ has been lowered, as the case may be. The arc length can be controlled both by varying the lower reference voltage and by varying the upper reference voltage. A change in the pulse recurrence rate also involves a change in the reference voltages, as shown in the diagrams. As these diagrams show, the pulse recurrence rate changes as a result.

Figure 5:
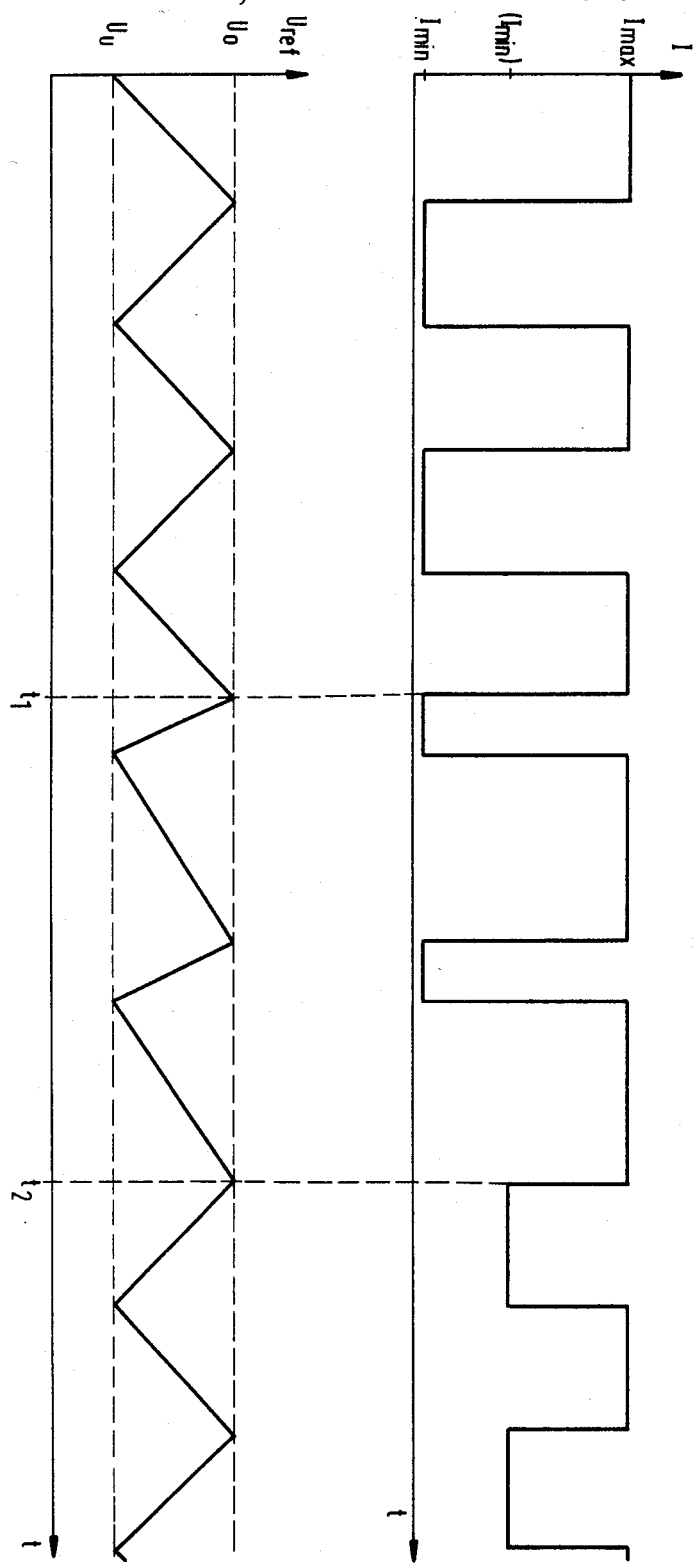
Figure 6:
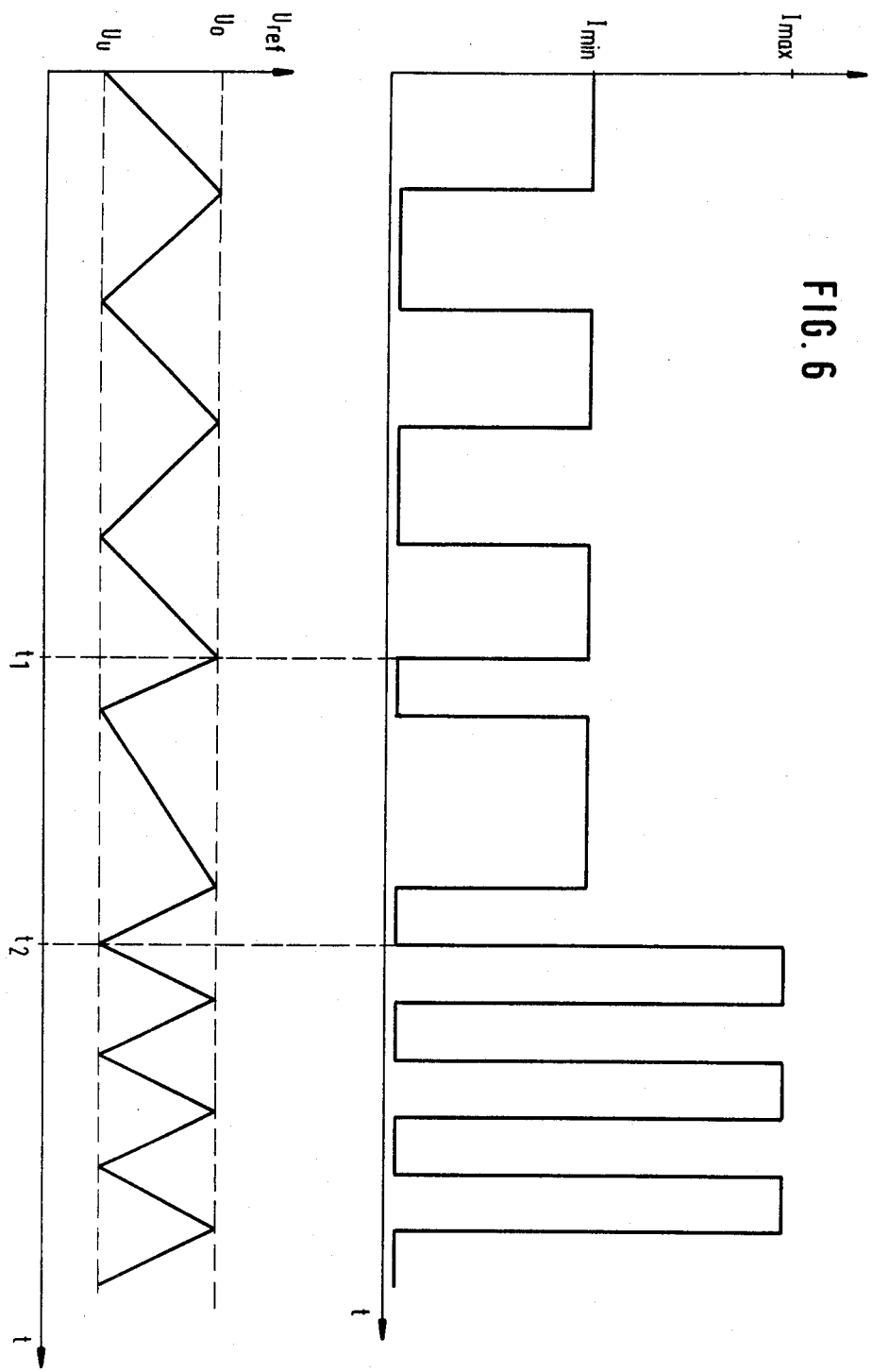

In the diagrams of FIGS. 5 and 6, the feed rate of the welding wire has been increased at instant $t_1$. This leads to a shortening of the zero currents and to a lengthening of the pulse duration. Now, as shown in the diagram of FIG. 5, if the interpulse current is increased in such a way that even during the interpulse periods there is an electrode burn-off, albeit at a reduced rate, the interpulse period is lengthened. If, on the other hand, at instant $t_2$ the pulsed current is increased while maintaining the feed rate, which has been increased at instant $t_1$, this leads to a shortening of the pulse, as shown in FIG. 6.

Therefore, by means of the feed rate, the lower and upper reference voltages, and the amplitude of the pulse current and the interpulse current, the operating conditions can be varied in several ways, so that it is possible to adapt the optimum conditions to the particular welding job. However, it can also be concluded from the diagrams that variations in the electrode feed rate, which can hardly be avoided with a manual guidance of the electrode, only result in a shortening or lengthening of the pulses or interpulse periods. By switching the constant current between a maximum current and a minimum current, the extinction of the arc as well as an undesired contact and, thereby, a short circuit, can be prevented with a high degree of certainty. Therefore, the process according to the invention offers advantages in the welding quality and welding speed.

The process is not limited to one specific arc welding process. It can also be practiced as MIG or MAG welding process, as well as a submerged-arc welding process.

What I claim is:

1. A metal arc welding method, wherein current is supplied to a consumable electrode for welding a workpiece, comprising the steps of:
   when the arc voltage reaches a predetermined low level, setting the arc current at a high constant value which ensures burn-off of the electrode; and
   when the arc voltage reaches a predetermined high level, setting the arc current at a low constant value to maintain the arc.

2. The method according to claim 1, wherein said low constant value is sufficiently low to prevent burn-off of said electrode.

3. The method of claim 1 or 2, wherein the feed rate of said consumable electrode with respect to said workpiece is variable.

4. The method of claim 1 or 2, wherein said electrode does not touch said workpiece and said arc is not quenched during said welding.

5. The method of claim 3, wherein the rate of burn-off said consumable electrode with said high constant current is larger than the feed rate of said electrode with respect to said workpiece.

6. A metal arc welding device of the type which advances a consumable electrode toward a workpiece, said device comprising:
   a current source with an output for providing current to the electrode; and
   a control means for controlling the current source in response to the arc voltage;
   wherein the current source is switched to output a low constant current by the control means when the arc voltage reaches a high reference voltage and, when the arc voltage reaches a low reference voltage, is switched to output a high constant current.

7. The device according to claim 6, wherein the control means comprises two parallel-connected comparators, to the inverting inputs of which are respectively applied said high and low reference voltages and said arc voltage, and a changeover switch having an input connected via respective diodes to the outputs of said two comparators for switching said current source between the high and low constant currents.

8. The device according to claim 6, wherein the current source comprises one of a transistorized and a thyristorized current source with a dynamic current-voltage characteristic.

9. The device according to claim 6, further comprising means for adjusting the feed rate of the electrode.

10. The device according to claim 6 wherein said upper and lower reference voltages and said high and low constant currents are adjustable.

11. The device of claim 6, said current source having a dynamic current voltage characteristic.

12. The device according to claim 7, wherein the current source comprises a current source with a static current-voltage characteristic, an electronic switch connected to the output of the current source, and a shunt in parallel with the switch.

13. The device of claim 7, 8, 12 or 9, wherein said high and low reference voltages and said high and low constant currents are adjustable.

14. The device of claim 7, 8 or 12, further comprising means for adjusting the feed rate of the electrode.

15. The device of claim 7, 8, 12, 9 or 10, wherein said electrode does not touch said workpiece and said arc is not quenched during said welding.

* * * * *

UNITED STATES PATENT AND TRADEMARK OFFICE
CERTIFICATE OF CORRECTION

PATENT NO. : 4,497,997

DATED : 5 Feb. 1985

INVENTOR(S) : Peter W. Bodewig

It is certified that error appears in the above-identified patent and that said Letters Patent is hereby corrected as shown below:

Col. 1, line 39, after "pulses" insert --(or "interpulse" periods),--.

Col. 2, line 19, delete "to".

Col. 4, line 29, "work" should be --workpiece--.

Signed and Sealed this

Thirtieth Day of July 1985

[SEAL]

Attest:

DONALD J. QUIGG

Attesting Officer     Acting Commissioner of Patents and Trademarks